(12) United States Patent
Neuburger et al.

(10) Patent No.: US 8,474,314 B2
(45) Date of Patent: Jul. 2, 2013

(54) FILL LEVEL SWITCH AND SENSOR ELEMENT FOR A FILL LEVEL SWITCH

(75) Inventors: Stefan Neuburger, Stadecken-Elsheim (DE); Thomas Musch, Bochum (DE)

(73) Assignee: Krohne Messtechnik GmbH, Duisburg (DE)

( * ) Notice: Subject to any disclaimer, the term of this patent is extended or adjusted under 35 U.S.C. 154(b) by 287 days.

(21) Appl. No.: 12/936,063

(22) PCT Filed: Mar. 27, 2009

(86) PCT No.: PCT/EP2009/002274
§ 371 (c)(1),
(2), (4) Date: Dec. 23, 2010

(87) PCT Pub. No.: WO2009/121530
PCT Pub. Date: Oct. 8, 2009

(65) Prior Publication Data
US 2011/0100120 A1    May 5, 2011

(30) Foreign Application Priority Data
Apr. 1, 2008  (DE) .......................... 10 2008 016 829

(51) Int. Cl.
*G01F 23/24* (2006.01)
(52) U.S. Cl.
USPC ......... 73/290 R; 73/290 B; 73/291; 73/304 R
(58) Field of Classification Search
USPC ............. 73/290 B, 290 V, 290 R, 291, 304 R, 73/304 C
See application file for complete search history.

(56) References Cited

U.S. PATENT DOCUMENTS

| | | | | |
|---|---|---|---|---|
| 4,025,846 A | * | 5/1977 | Franz et al. | 324/671 |
| 4,107,994 A | * | 8/1978 | Sogo | 73/290 V |
| 4,142,415 A | * | 3/1979 | Jung et al. | 73/304 C |
| 4,440,022 A | * | 4/1984 | Masom | 73/293 |
| 4,603,581 A | * | 8/1986 | Yamanoue et al. | 73/304 C |
| 4,807,471 A | * | 2/1989 | Cournane et al. | 73/290 R |
| 4,924,700 A | * | 5/1990 | Habart | 73/290 V |
| 4,954,997 A | * | 9/1990 | Dieulesaint et al. | 367/13 |
| 5,304,936 A | * | 4/1994 | Buschur | 324/689 |
| 5,315,872 A | * | 5/1994 | Moser | 73/304 C |

(Continued)

FOREIGN PATENT DOCUMENTS

| DE | 1 191 594 B | 4/1965 |
|---|---|---|
| DE | 198 17 378 A1 | 10/1999 |

(Continued)

*Primary Examiner* — David Rogers
(74) *Attorney, Agent, or Firm* — Roberts Mlotkowski Safran & Cole, P.C.; David S. Safran (57) ABSTRACT

A fill level switch (1) for measuring the fill level of a medium in a container (2), having a sensor element (3) for contacting the medium, a sender (4) for applying an electromagnetic emission signal to the sensor element (3) and an evaluation unit (5) for detecting a received signal from the sensor element (3). The sensor element (3) includes at least one cable (6) for guiding the emission signal. To provide a fill level switch, which is based on a sturdy measuring principle and which allows for reliable cleaning, the fill level switch uses a delay line as the cable (6) of the sensor element (3) and the sensor element (3) has a window (7) facing the medium in the mounted position of the fill level switch and at least a part of the cable (6) can be electrically influenced by the medium via the window (7).

24 Claims, 6 Drawing Sheets

U.S. PATENT DOCUMENTS

| | | | |
|---|---|---|---|
| 5,586,085 A * | 12/1996 | Lichte | 367/99 |
| 5,610,635 A * | 3/1997 | Murray et al. | 347/7 |
| 6,281,801 B1 | 8/2001 | Cherry et al. | |
| 6,441,622 B1 | 8/2002 | Wrzesinski et al. | |
| 6,490,920 B1 * | 12/2002 | Netzer | 73/304 C |
| 6,536,275 B1 * | 3/2003 | Durkee et al. | 73/290 V |
| 6,564,658 B2 | 5/2003 | Pchelnikov et al. | |
| 6,696,962 B2 | 2/2004 | Kelly | |
| 6,925,869 B2 * | 8/2005 | Senibi et al. | 73/290 V |
| 7,258,005 B2 * | 8/2007 | Nyce | 73/304 C |
| 7,456,752 B2 * | 11/2008 | Oberle | 340/604 |
| 7,730,780 B2 | 6/2010 | Neven et al. | |
| 7,798,586 B2 * | 9/2010 | Watanabe | 347/7 |
| 7,814,786 B2 * | 10/2010 | Woodard | 73/291 |
| 7,878,609 B2 * | 2/2011 | Tsukada et al. | 347/7 |
| 2001/0000851 A1 * | 5/2001 | Morimoto | 73/304 C |
| 2002/0015068 A1 * | 2/2002 | Tsukada et al. | 347/19 |
| 2007/0181683 A1 * | 8/2007 | Woodard et al. | 235/451 |
| 2010/0126267 A1 * | 5/2010 | Agam et al. | 73/290 V |

FOREIGN PATENT DOCUMENTS

| | | |
|---|---|---|
| DE | 101 15 150 A1 | 4/2002 |
| DE | 10 2005 044 143 A1 | 3/2007 |
| DE | 10 2005 057 053 A1 | 5/2007 |
| EP | 0 866 321 A2 | 9/1998 |
| EP | 1 128 169 A1 | 8/2001 |
| JP | 2004-93213 A | 3/2004 |

* cited by examiner

FILL LEVEL SWITCH AND SENSOR ELEMENT FOR A FILL LEVEL SWITCH

BACKGROUND OF THE INVENTION

1. Field of the Invention

The invention relates to a fill level switch for measuring the fill level of a medium in a container, having a sensor element for contacting the medium, a sender for applying an electromagnetic emission signal to the sensor element and having an evaluation unit for detecting a received signal from the sensor element, wherein the sensor element includes at least one cable for guiding the emission signal. Moreover, the invention relates to a sensor element for such a fill level switch.

2. Description of Related Art

Fill level switches have been known in industrial process measurement engineering for multiple decades and serve to detect the fill level of a medium in a container, wherein the medium affects the sensor element once it has reached a certain fill level or a certain fill level area. Due to the influence on the sensor element by the medium, a certain measured variable of the sensor element changes—depending on the embodiment of the fill level switch—and when a certain level of the reading is exceeded; a certain fill level is then considered to have been measured.

When a fill level switch is mentioned in the following, then it is not intended to be limited to the fill level switch actually triggering switching, rather it is intended, in general, that a certain fill level can be detected by comparing a reading with a—pre-settable—level and/or the fill level switch is only appropriate simply due to its construction to detect an essentially selective fill level.

The measuring principles used with fill level switches are partially based on the evaluation of mechanical or electric oscillations or simply on the evaluation of the change of a conductance value (conductive fill level switch). All of the fill level switches considered have in common that the medium of which the level is to be measured comes into contact or, respectively, has to come in contact with the sensor element.

Fill level switches that are based on the evaluation of a mechanical oscillation are desirably used, since the measuring principle is suitable for different media and is quite sturdy in respect to variations of particular media characteristics, such as, e.g., the density and viscosity of a medium. In these fill level switches, the oscillation of an oscillation fork is evaluated, which has been excited to a resonance oscillation by actuators and which is damped and also changed in its frequency by a medium surrounding the oscillation fork.

Disadvantages of fill level switches of this type, however, are that the sensor element has to be extended into the medium to be detected, the dependency of the measurement on the mounting position of the fill level switch as well as a possibly problematic cleaning of the sensor element designed as oscillation fork, since the risk of "formation of shades" is always present when spraying the inside of the container, i.e., there is a risk that the sensor element hides parts of itself and the cleaning fluid used is not able to reach all parts of the sensor element.

Other limit switches, such as, e.g., conductive limit switches extend comparably far into the medium to be detected, even when the sensor element designed as one electrode or multiple electrodes is only formed with a stub shape. The cable contained in the sensor element contacts the electrodes, wherein the emission signal usually consists of a simple alternating voltage, which—depending on the conductivity of the medium to be detected—causes measurement currents of different sizes. In such cases, in which the medium cannot be supplied with a continuously-acting alternating electric field, the use of such a conductive limit switch is prohibited; furthermore, there are also problems, here—as explained above in the oscillation fork fill level switches—in view of cleaning, which is relevant, in particular, in food and hygiene applications.

SUMMARY OF THE INVENTION

The object of the present invention is to prevent—at least partially—the above disadvantages in the known fill level switches, in particular, to specify a fill level switch, which is based on a sturdy measuring principle and which allows for reliable cleaning and essentially attains measuring results independent of the mounting position.

The described object is met, first and essentially, according to the invention with the fill level switch in question in that the cable of the sensor element is designed as a delay line, the sensor element has a window facing the medium in the mounting position of the fill level switch and at least a part of the cable can be electrically influenced by the medium via the window.

A delay line is, here, fundamentally, an electric cable, via which an electromagnetic signal—the emission signal—can be propagated, as is known, for example, from time-domain reflectometry (TDR). The fill level switch according to the invention is, thus, basically based on the principle of measuring a round-trip time (RTT), i.e., the certainty of the finite propagation speed of electromagnetic signals through the cable is used, wherein the time interval is measured, which the emission signal—an emitted electromagnetic wave—requires in order to propagate from the sender or the feed source in the cable to a point of influence of the delay line and back to the evaluation unit. The physical effect used here exists in that an electromagnetic wave is partially reflected and partially transmitted everywhere in a propagation medium—here in the cable—where the material characteristics, i.e., permittivity or permeability, have a point of discontinuity or where the inductance distribution or capacitance distribution of the arrangement has a point of discontinuity—for example due to a geometric discontinuity.

The task of a fill level switch is, naturally, not to determine an exact measurement of the RTT of the outgoing and return path of the emission signal, but rather, interest lies mainly in identifying whether the sensor element has been reached by the medium or not using a reflection of the emission signal caused by an impedance jump.

A reflection of an electromagnetic wave guided by a cable is possible with practically every electric cable, even without it being designed specifically as a delay line. In the fill level switch according to the invention, the cable is designed as a delay line in order to convert the time intervals to be measured into a manageable, i.e., useable for technical measurement, scope.

In a preferred embodiment of the invention, the cable is at least partially arranged in a flat configuration, which is very preferably a flat dense configuration so that the delay line is highly concentrated in total in terms of its geometric expansion. In addition, it is of particular advantage when the cable is formed overall of a outgoing line and a return line, wherein the one end of the outgoing line and one end of the return line are connected or can be connected to the sender and/or the evaluation unit. Such cables have a—depending on the design—comparably large inductance and/or capacitance per unit length, so that the propagation speed of an electromagnetic wave on such a cable is comparably small, since the propagation speed of an electromagnetic wave on a cable corresponds to the reciprocal of the square of the inductance per unit length and the capacitance per unit length of this cable. In this context, it is advantageous when the other end of the outgoing line and the other end of the return line are or can be electrically connected to one another via a connecting means. Suitable dimensioning of these connecting means can, for example, makes it possible that there are no reflections of the sensor signal in an unaffected state of the cable.

In a further advantageous embodiment of the invention, the flat configuration of the cable is designed in the manner of a spiral or a meander, or for example, using connected circle segments. These structures have the advantage that a relatively long cable can be implemented over a comparably small area, wherein it should be taken into consideration that the course is implemented so that there are no unintentional reflections of the emission signal on the curves of the cable. Furthermore, a spiral structure has the advantage that the measuring signal is dependent only to a very small extent on the mounting position of the fill level switch, or respectively, the sensor element.

In a further preferred embodiment of the invention, the cable of the sensor element is implemented on or in at least one carrying layer, in particular, a plane carrying layer, wherein the carrying layer is, in particular, a ceramic layer, preferably a low temperature or a high temperature co-fired ceramic. The use of this printed circuit board technology has the advantage that any circuit structure can be made with little effort, wherein the emerging layered ceramic fulfills high stability specifications.

The above-mentioned printed circuit board technology is advantageous, in particular, in view of a further embodiment of the invention, in that the window is formed by a thin dielectric layer in the electrically influenceable area of the cable, in particular, this can be a ceramic layer. Such a layer can—for example, using a ceramic film—be made extremely thin and at the same time provide good protection against corrosion. In this context, it has been shown to be advantageous to use a glass layer.

By implementing a window in the area of the delay line according to the invention, it is, in particular, possible to strongly limit the area of influence of the cable by the medium, whereby the fluctuation in the RTT of the expected reflection signals is very low. The frame of the window can be implemented, in particular, by using a further medium-side coat on the surface of the sensor element, in particular using a further ceramic layer or using multiple ceramic layers.

In another advantageous embodiment of the invention, the frame of the window is functionally formed in that the parts of the cable running along the area of the window are provided on or in an upper carrying layer and the parts of the cable running beyond the area of the window are provided on or in a deeper carrying layer. This embodiment has the advantage that a medium-side level termination face of the sensor element can be implemented while having a precise definition of the window through which the medium is able to influence the cable.

In a particularly preferred embodiment of the invention, it is provided that the cable or the environment in the impact area of the cable has at least one electric reference point of discontinuity. This reference point of discontinuity forms an impedance jump and causes a desired partial reflection of the emission signal always at the same point. This reference reflection at the reference point of discontinuity can, for example, become a function check of the fill level switch, or respectively, the sensor element, namely, is evidence that the emission signal—at least up to the reference point of discontinuity—propagates along the cable and back.

The electric reference point of discontinuity can, for example, be provided in an area beyond the window, which guarantees a certain temporal spacing of the reference reflection signal from a reflection of the emission signal caused by influence on the cable in the area of the window. Alternatively or additionally, the reference point of discontinuity can be provided in the area within the window, here, in particular, in the area of the other end of the outgoing line and the other end of the return line. Using such an electric reference point of discontinuity ensures that the functional capability of the entire cable can be determined when a reflected emission signal emerges again with a time-delay at the entrance end of the cable.

In a further preferred embodiment of the invention, the sender and/or the evaluation unit is/are arranged on the side of the sensor element facing away from the medium. This is easily implemented when the carrying layer is a ceramic layer made using LTCC or HTCC technology (LTCC=low temperature co-fired ceramics; HTCC=high temperature co-fired ceramics). It is appropriate, here, in particular, to arrange the sender and/or the evaluation unit on the side of the carrying layer facing away from the medium or on or in the outermost ceramic layer of the sensor element facing away from the medium. Not only can electronic components in circuit board technology be made here, but any component, for example, in SMD technology, can also be applied and assembled here.

In a further preferred embodiment of the invention, the side of the sensor element facing away from the medium is at least partially enclosed by a housing, in particular, by a metallic housing, which is advantageous in view of electromagnetic shielding as well as robustness.

In a preferred embodiment of the fill level switch, an electrode structure for measuring conductivity is provided on or in the outer side of the sensor element facing the medium, which increases the applicability of the fill level switch overall. Due to the measurement of conductivity, it is possible to obtain redundant information about the influencing state of the fill level switch or, respectively the sensor element of the fill level switch. Furthermore, the electrode structure for measuring conductivity is also suitable for identifying adhesions on the sensor element. It has been shown to be advantageous for the measurement of conductivity when the electrode structure can be contacted, in particular, directly by the medium.

In a further particularly preferred embodiment of the invention, an antenna structure is implemented on or in the sensor element, with which electromagnetic waves can be emitted essentially in the direction of the medium and electromagnetic waves can be received from the direction of the medium, wherein the antenna structure, in particular, is designed as a flat antenna having a directed emission characteristic, in particular, as a micro strip antenna. This additional antenna structure allows additional information about the fill level in the container to be obtained using simple measures, even of a fill level that is independent of contact with the sensor element by the medium. Using this antenna structure, a fill level of the medium can also be determined, in which the medium is spaced at a considerable distance from the fill level switch, i.e., further information can be attained exceeding the information gained through the cable—medium present at sensor element, no medium present at sensor element—which, on the one hand, augment the functional capability of the fill level switch above and beyond the original function, however, on the other hand, can be used as redundant information and thereby substantially increase the system stability and functional verifiability of the fill level switch.

In a further preferred embodiment of the invention, the antenna structure is connected to the cable or is at least connectable to the cable, in particular, via switchable connecting means. In this case, the antenna structure can be fed via the cable and the receiving signal of the antenna structure can also be led over the cable to the evaluation unit again. This leads to saving of additional contacts through the carrying layer, which is particularly advantageous since these feedthroughs have to be suitable for high frequencies, and are thus, particularly complex and expensive to produce. The antenna structure can, just like the cable, also be implemented on the carrying layer and covered by a further layer, wherein this further layer has a purely protective function and should not be electrically operative, so that the emission of electromagnetic waves from the antenna structure are not obstructed. Above all, micro strip antennae can be easily implemented, wherein planar bipolar antennae are easily produced in that a closed reflection circuit layer, over which—spaced over a dielectric layer—several dipole elements and over which—spaced over a further dielectric layer—a conductive mask is arranged for forming the electromagnetic waves.

In the fill level switch according to the invention, the sender and the evaluation unit are designed, in particular, so that the cable can be impinged with an electromagnetic signal and/or the antenna structure can be impinged with an electromagnetic signal, the runtime of an electromagnetic signal reflected by a point of discontinuity of the cable can be determined and/or the runtime of an electromagnetic signal emitted by the antenna structure, reflected by the medium and detected again by the antenna structure can be determined. In this process, the presence and, as the case may be, the spacing of a medium are determined using the determined runtime.

Furthermore, the invention relates to a sensor element for a fill level switch of the type described above that serves to detect a medium and has a cable for guiding an emission signal, wherein this sensor element is equipped with one or with several of the above described features.

In detail, there are multiple possibilities for designing and further developing the sending and receiving device according to the invention. Please refer, here, on the one hand, to the patent claims subordinate to patent claim 1 and, on the other hand, to the following description of embodiments in connection with the drawing. The drawing shows

DETAILED DESCRIPTION OF THE INVENTION

Figure 1:
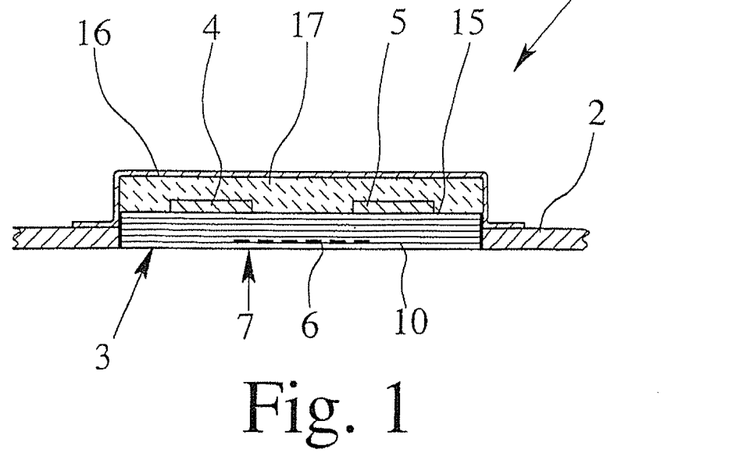
FIG. 1 is sectional view of an embodiment of a fill level switch according to the invention in the mounted position in a container.
Figure 2:
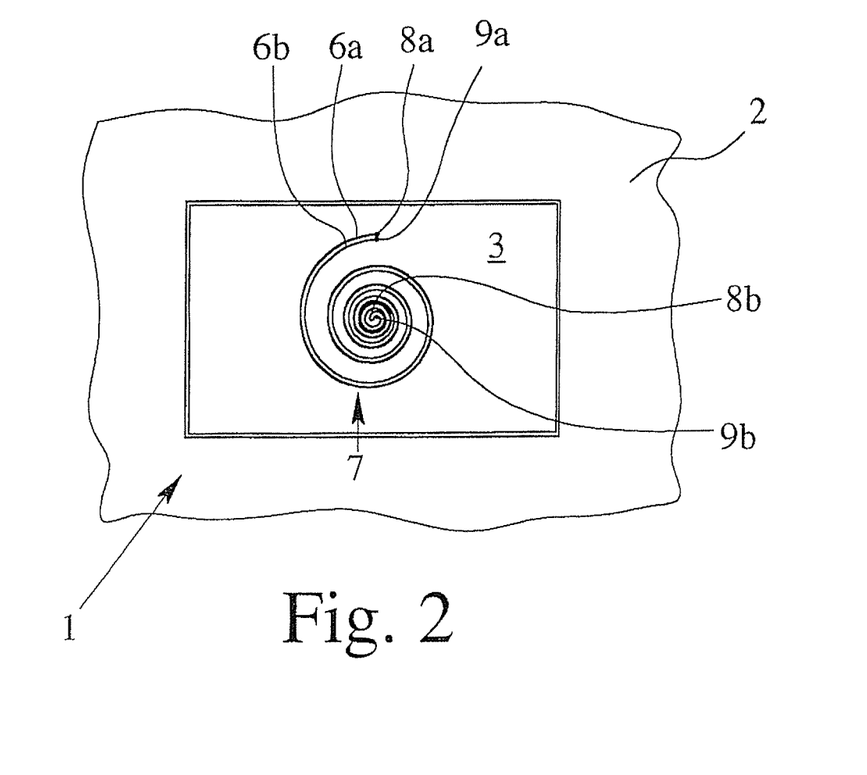
FIG. 2 is medium-side plan view of the fill level switch according to FIG. 1, FIG. 3 medium-side plan view of a sensor element according to the invention having a meander-shaped cable.

FIGS. 1 & 2 show a complete fill level switch 1 according to the invention for determining the fill level of a medium—not shown—in a container 2 having a sensor element 3 for contacting the medium, having a sender 4 for impinging the sensor element 3 with an electromagnetic emission signal and having an evaluation unit 5 for detecting a received signal from the sensor element 3, wherein the sensor element has a cable 6 for guiding the emission signal. In the other FIGS. 3-8, a respective sensor element 3 according to the invention is shown that is suitable for implementing a fill level switch according to the invention.

All of the illustrated fill level switches 1, or respectively, sensor elements 3 are characterized in that the cable 6 of the sensor element 3 is designed as a delay line, the sensor element 3 has a window 7 facing the medium in the mounted position of the fill level switch 1 and at least a part of the cable 6 can be electrically influenced by the medium via the window.

In contrast to fill level measuring devices that use a delay line and work according to the principle of time domain reflectometry, in the illustrated fill level switches 1 or sensor elements 3 for fill level switches 1, it is not important that the cable 6 extends in the measuring direction, rather it is intended to limit the cable 6 to a small area so that a defined point of detection of the medium is possible. The use of a delay line is grounded in that the detection of reflected, delayed portions of the emission signal is more easily possible than non-delayed dispersed signals, mainly since the distance between the sender 4 and the cable 6 in the area of the window 7 is extremely short and the detection of signal RTTs of non-delayed signals over this distance can only be put into practice with substantial monitoring efforts.

In all of the illustrated embodiments, the cable 6 is arranged in a flat compact configuration, wherein the cable 6 is formed of an outgoing line 6a and a return line 6b—emphasized, in particular, in FIG. 2—wherein one end 8a of the outgoing line 6a and the one end 9a of the return line 6b are connected with the sender 4, which is, however, not shown in detail. The other end 8b of the outgoing line 6a and the other end 9b of the return line 6b are electrically connected to one another via connecting means, in which, namely, the cable 6 is continually implemented in this reversal point.

Figure 3:
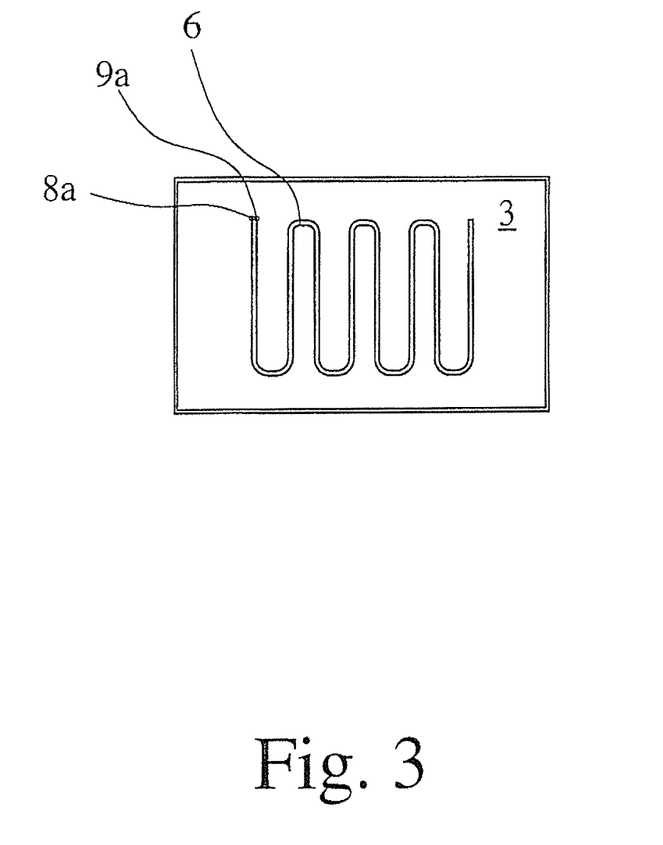
Figure 4A:
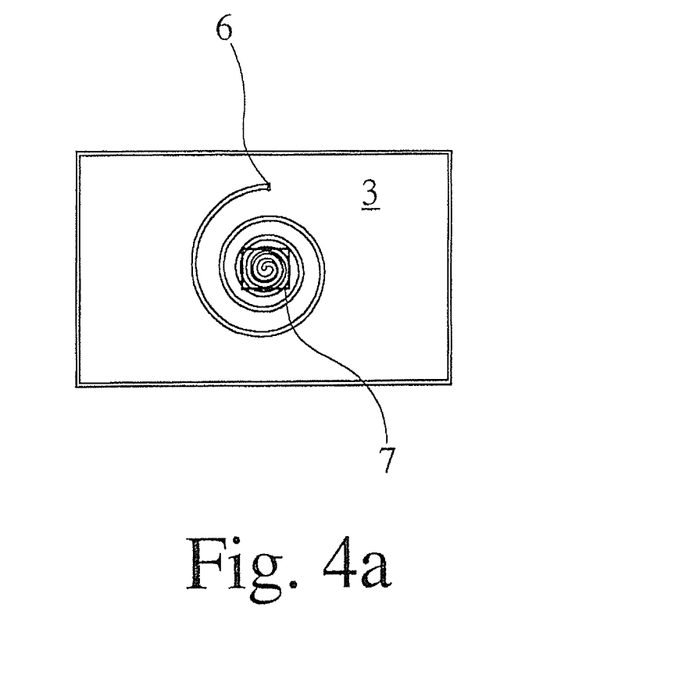
FIGS. 4a & 4b are a medium-side plan view and a cross-sectional view, respectively of a further sensor element according to the invention having a spiral-shaped cable and window.
Figure 4B:
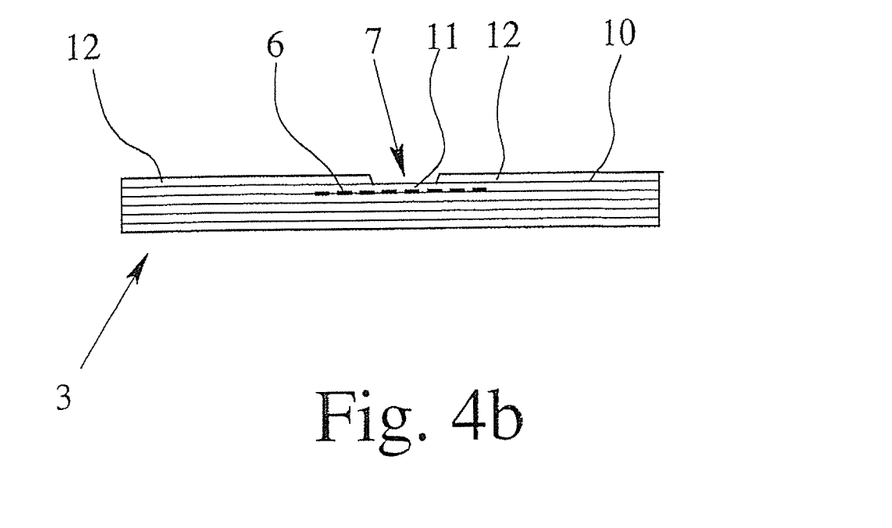

The cable 6 is designed in the form of a spiral in FIGS. 1, 2 and 4 to 8, while the cable 6 in FIG. 3 is designed in a meandering shape. In both cases, a substantial length of the cable 6, and thus, a substantial lengthening of the signal runtime can be implemented due to the tightly lying loops of the cable 6 over a small area.

In the embodiments shown in FIGS. 1 to 8, the cable 6 is implemented on a carrying layer 10, which is formed of a ceramic layer that has been produced according to low temperature co-fired ceramic technology (LTCC). The advantage of this technology is that, even with a relatively large total thickness of the sensor element 3, and where applicable, of the window 7, very thin layers can be produced between the actual cable 6 of the sensor element 3 and the inside of the container 2.

In all of the figures, the window is formed by a thin dielectric layer 11 in the electrically influenceable area of the cable 6, here, namely, by a ceramic layer. In the case of embodiments according to FIGS. 1 to 3 and 6, the window 7 is simply extended over the area in which the cable 6 is extended. In the case of the embodiments shown in FIGS. 4 and 8, the frame of the window 7 is formed by a further medium-side layer 12, here, namely, ceramic layers. Using the spacing of the medium produced by the later 12 on the cable 6, the sensor element 3 is insensitive to contacting medium in this area; the sensitive area of the sensor element 3 is defined solely through the window 7.

Figure 5:
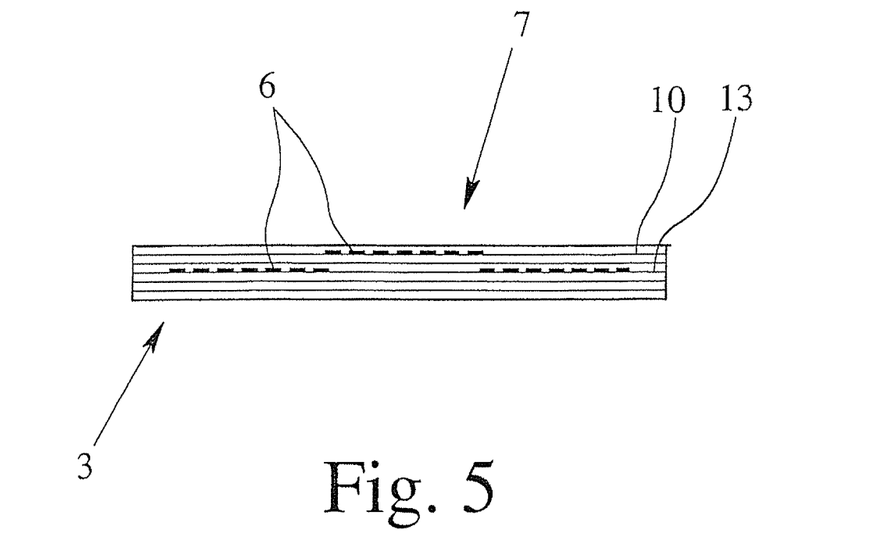
FIG. 5 is a cross-sectional view of a further embodiment of a sensor element according to the invention having a cable in two carrying layers.
Figure 7A:
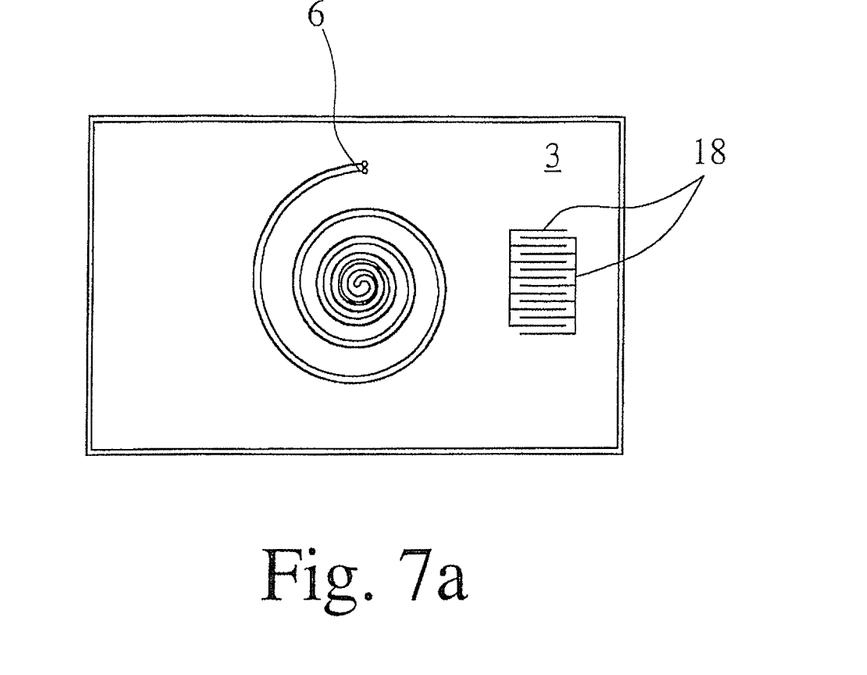
FIGS. 7a & 7b are plan and sectional views, respectively, of a sensor element according to FIG. 5 having an additional electrode structure for measuring conductivity
Figure 7B:
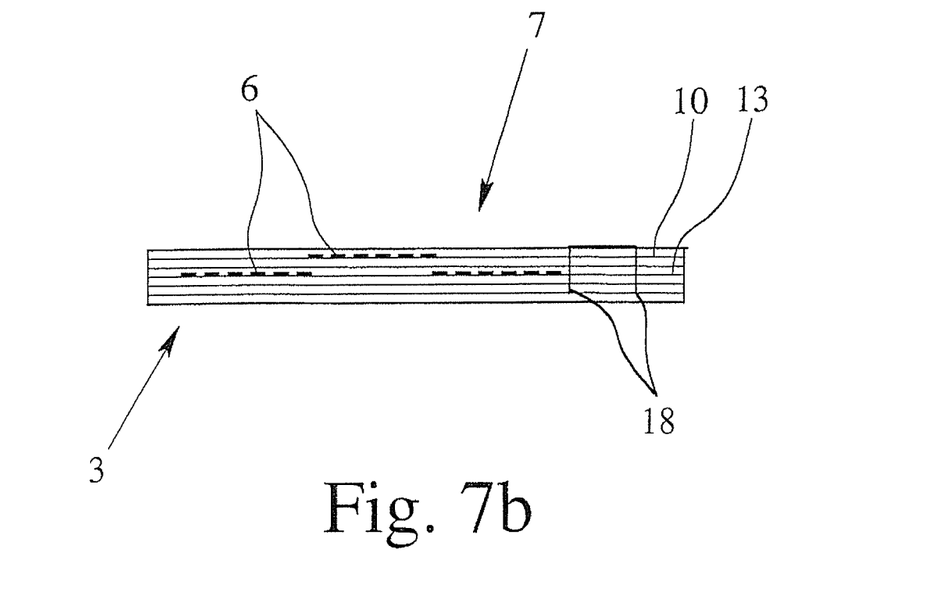

In the embodiments of FIGS. 5 & 7, parts of the cable 6 in the area of the window 7 are provided on or in an upper carrying layer 10 and parts of the cable 6 beyond the window 7 are provided on or in a deeper carrying layer 13. The spacing of parts of the cable 6 from the medium can be implemented in the same manner by arranging the cables 6 in several—here, two—levels. The embodiments shown in FIGS. 1, 2, 5 and 7 have the further advantage that the medium-side surface of the sensor element 3 is smooth, and thus, particularly easy to clean or, respectively, in the case of an appropriate coating, doesn't even offer a contact surface for medium adhesion.

Figure 6:
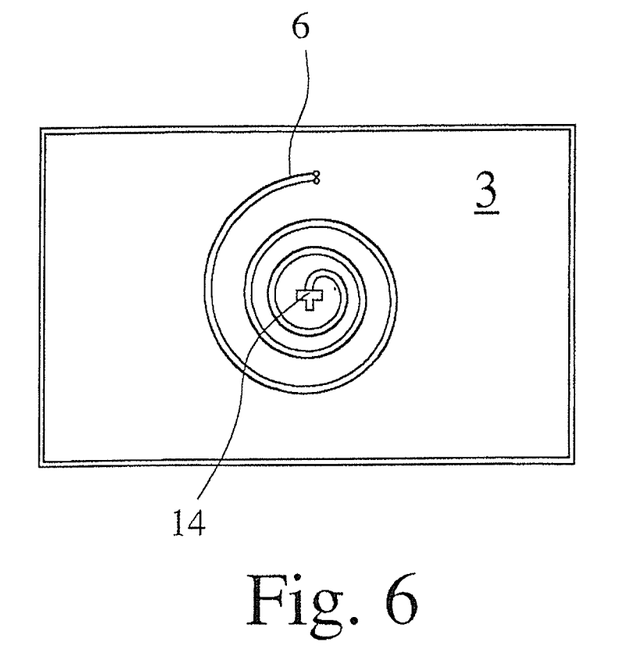
FIG. 6 is a plan view of a sensor element according to the invention having a cable with an electric reference point of discontinuity.

The sensor element 3 shown in FIG. 6 has a cable 6 with an electric reference point of discontinuity 14. At this reference point of discontinuity 14, an impedance jump in the cable 6 is achieved using geometric irregularities in the cable path. This electric reference point of discontinuity 14 makes sure that a part of the emission signal is reflected. This reflected emission signal can, for example, serve as an independent error diagnosis or, respectively a function check of the fill level switch 1. In the sensor 3 according to FIG. 6, the reference point of discontinuity 14 is provided on the end of the cable 6, which has the advantage that the entire length of the cable 6 can be functionally monitored.

Other embodiments—not shown here—have such reference points of discontinuity in the area outside the area of the window, where, though the entire length of the cable cannot be monitored, reflections of the reference point of discontinuity can, for example, be differentiated from reflections of the emission signal, which were caused by medium in the area of influence of the cable.

In the fill level switch 1 according to FIG. 1, the sender 4 and the evaluation unit 5 are arranged on the side of the sensor element 3 facing away from the medium, namely on the outermost ceramic layer 15 facing away from the medium. This has the advantage that a separate carrier does not have to be provided for the electronic circuit of the sensor element 3. In the embodiment according to FIG. 1, the sender 4 and the evaluation unit are shown as separate components, this, however, is not necessary. Moreover, further embodiments are possible without further ado, in which the sender and the evaluation unit are designed as a single integrated electronic component or in which the sender and/or evaluation unit are form of several discreet components.

It is further shown in FIG. 1 that the side of the sensor element 3 facing away from the medium is surrounded by a housing 16, wherein this housing 16 is a metallic housing. The space between the side of the sensor element 3 facing away from the medium and the housing 16 is cast with a hardening casting compound 17, wherein this casting compound 17 is an electrically insulating casting resin. This embodiment has the advantage that the fill level switch 1, or respectively, the sensor element 3 is extremely pressure resistant, since the sensor element 3 can support itself via the casting compound 17 on the housing 16 when pressure is applied by the medium.

In the sensor element 3 according to FIGS. 7a & 7b, an electrode structure 18 for measuring conductivity is provided on the outside of the sensor element 3 on the side facing the medium, wherein this electrode structure 18 is provided outside of the window 7 and can be directly contacted by the medium. The electrode structure 18 is formed of interdigitated, closely neighboring conductors, so that only a small voltage is necessary to obtain an appropriate identification signal for the conductivity. It is not further shown in the figures how the electrode structure 18 is attached; this is presently not relevant.

Figure 8A:
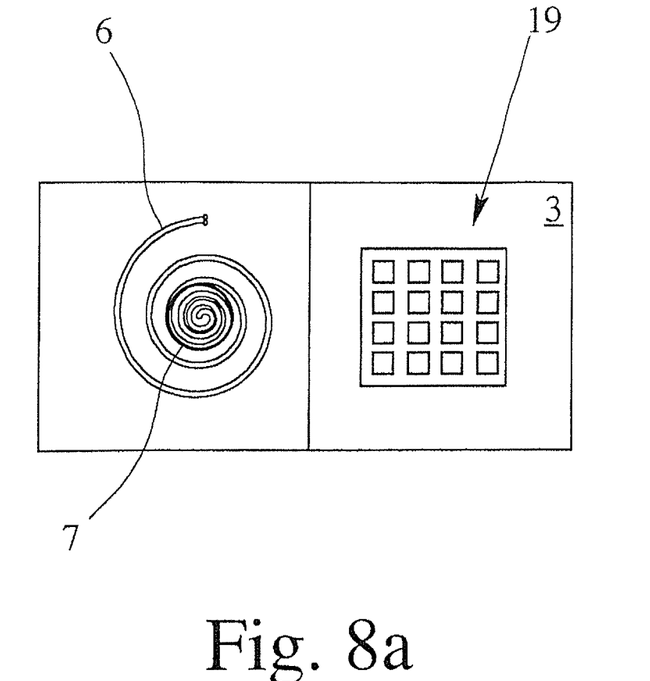
FIGS. 8a & 8b are plan and sectional views, respectively, of a sensor element according to the invention according to FIGS. 4a & 4b having an additional antenna structure.
Figure 8B:
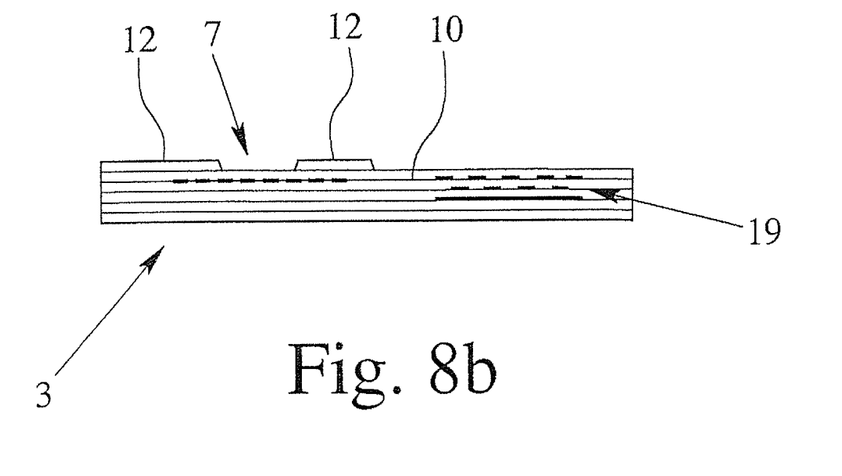

In the embodiments according to FIGS. 8a & 8b, an antenna structure 19 is implemented on the sensor element 3, with which electromagnetic waves can be emitted in the direction of the medium and electromagnetic waves can be received from the direction of the medium, wherein the antenna structure 19 is designed as a micro strip antenna having a comparably good, directed radiation characteristic. In FIG. 8b, the configuration of the antenna structure 19 disposed on several ceramic layers can be identified, wherein a layer of multiple bipolar elements follows a lower metallic reflector, and on this layer, a metallic mask adapted thereto follows, wherein these three layers are spaced from each other by a ceramic layer. Within certain limits, a measurement of the spacing of the sensor element 3 from the medium is possible with the sensor element according to FIG. 8a.

All in all, the electrode structure 18 according to FIGS. 7a & 7b as well as the antenna structure 19 according to FIGS. 8a & 8b show measures that make a redundant detection of the medium possible. This considerably increases the system stability and the self-test possibilities of the fill level switch 1 designed in such a manner, or respectively, the sensor element 3 designed in such a manner. Of course, all measures can be combined in one single sensor element 3.

In total, the sender 4 and the evaluation unit 5 are designed in such a manner that the cable 6 can be impinged with an electromagnetic signal and—in the case of the embodiment according to FIGS. 8a & 8b—the antenna structure 19 can be impinged with an electromagnetic signal and the RTT of an electromagnetic signal reflected at a point of discontinuity of the cable 6 can be determined and/or the RTT of an electromagnetic signal emitted via the antenna structure 19, reflected by the medium and detected again by the antenna structure 19 can be determined.

What is claimed is:

1. Fill level switch for measuring the fill level of a medium in a container, comprising:
   a sensor element for contacting the medium, the sensor element having a window facing the medium in a mounted position of the fill level switch in the container,
   a sender for applying an electromagnetic emission signal to the sensor element, and
   an evaluation unit for detecting a received signal from the sensor element,
   wherein the sensor element includes at least one cable for guiding the emission signal, the cable being a delay line, at least a part of which is electrically influenceable by the medium via the window.

2. Fill level switch according to claim 1, wherein the carrying layer is a ceramic layer.

3. Fill level switch according to claim 1, wherein the window is formed of a thin dielectric layer in an electrically influenceable area of the cable.

4. Fill level switch according to claim 1, wherein at least one of the sender and the evaluation unit are arranged on a side of the sensor element that faces away from the medium in the mounted position of the fill level switch in the container.

5. Fill level switch according to claim 1, wherein an electrode structure for measuring conductivity is provided on or in an outer side of the sensor element that faces the medium where the electrode structure can be directly contacted by the medium.

6. Fill level switch according to claim 1, wherein the antenna structure is a flat micro strip antenna having a directed emission characteristic.

7. Fill level switch according to claim 1, wherein the cable is at least partially arranged in a flat configuration.

8. Fill level switch according to claim 7, wherein the flat configuration of the cable has at least one of a spiral, meander and connected circle segments shape.

9. Fill level switch according to claim 1, wherein the cable comprises an outgoing line and a return line, wherein a first end of the outgoing line and a first end of the return line are connected to at least one of the sender and the evaluation unit and wherein a second end of the outgoing line and a second end of the return line are electrically connected to one another.

10. Fill level switch according to claim 9, wherein at least one electric reference point of discontinuity in an area inside of the window in an area of the second end of the outgoing and return lines.

11. Fill level switch according to claim 1, wherein the cable is on or in at least one carrying layer.

12. Fill level switch according to claim 11, wherein at least one of the sender and the evaluation unit are arranged on a side of the at least one carrying layer that faces away from the medium in the mounted position of the fill level switch in the container.

13. Fill level switch according to claim 1, wherein the window has a frame is formed on a medium-facing side of the sensor.

14. Fill level switch according to claim 13, wherein parts of the cable run along an area of the window on or in an upper carrying layer and parts of the cable running beyond the area of the window are provided on or in a deeper carrying layer.

15. Fill level switch according to claim 1, wherein the cable has at least one electric reference point of discontinuity, wherein the point of discontinuity is provided in an area outside of the window.

16. Fill level switch according to claim 15, wherein the at least one cable of the sender and the evaluation unit are adapted for determining a round-trip time of an electromagnetic signal reflected by the point of discontinuity of the cable.

17. Fill level switch according to claim 1, wherein a side of the sensor element that faces away from the medium in the mounted position of the fill level switch in the container is at least partially enclosed by a metallic housing.

18. Fill level switch according to claim 17, wherein an electrically insulating casting resin is provided in a space between the side of the sensor element that faces away from the medium and the housing.

19. Fill level switch according to claim 1, wherein an antenna structure is provided on or in the sensor element, the antenna structure being adapted for emitting electromagnetic waves essentially in a direction toward the medium and for receiving electromagnetic waves in a direction from the medium, in the mounted position of the fill level switch in the container.

20. Fill level switch according to claim 19, wherein the antenna structure is connected with the cable via a switchable connecting means.

21. Fill level switch according to claim 19, wherein the at least one cable of the sender and the evaluation unit are adapted for determining a round-trip time of an electromagnetic signal emitted by the antenna structure, reflected by the medium and detected again by the antenna structure.

22. Sensor element for a fill level switch for detecting a medium, comprising:
   a window for facing the medium in a mounted position of the fill level switch in the container, and
   at least one cable for guiding an emission signal, the cable being a delay line, at least a part of which is electrically influenceable by the medium via the window.

23. Fill level switch according to claim 22, wherein the cable has flat configuration having at least one of a spiral, meander and connected circle segments shape.

24. Fill level switch according to claim 22, wherein the cable has at least one electric reference point of discontinuity, wherein the point of discontinuity is provided in an area outside of the window.

* * * * *